(No Model.)
J. MEYRICK, Jr.
BALL BEARING DEVICE.
No. 603,570. Patented May 3, 1898.
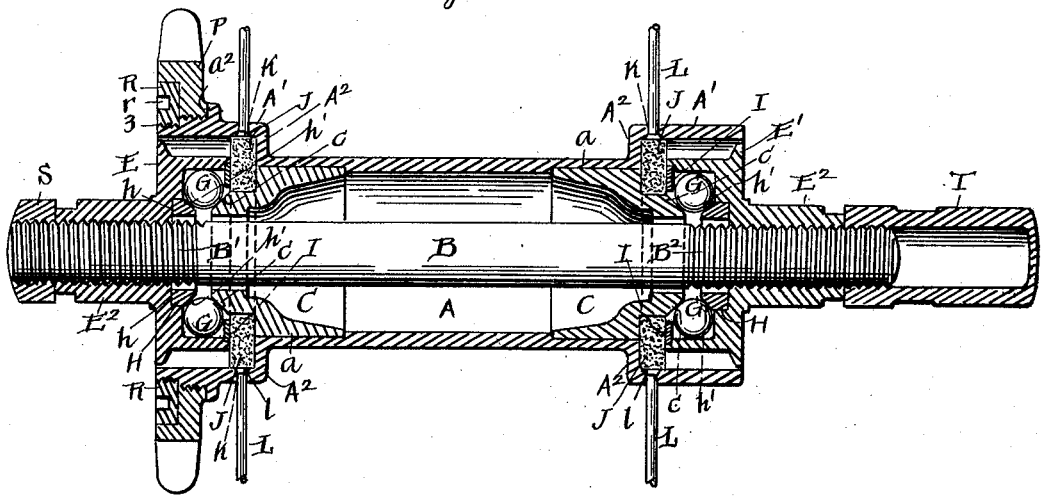
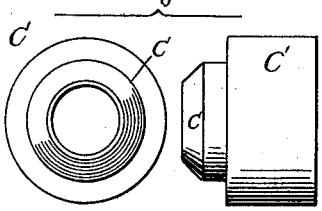
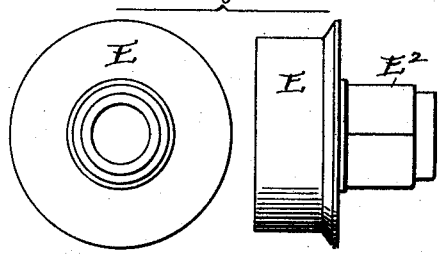
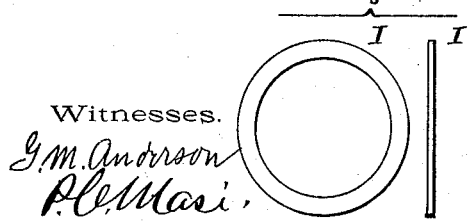
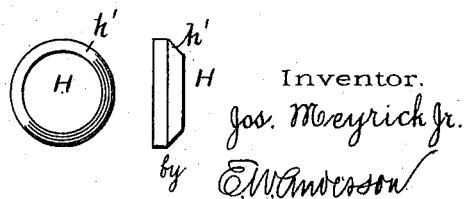
Witnesses.
G. M. Anderson
P. C. Masi
Inventor.
Jos. Meyrick Jr.
by E. W. Anderson
his Attorney.

UNITED STATES PATENT OFFICE.

JOSEPH MEYRICK, JR., OF LOUISVILLE, KENTUCKY.

BALL-BEARING DEVICE.

SPECIFICATION forming part of Letters Patent No. 603,570, dated May 3, 1898.

Application filed January 18, 1897. Serial No. 619,599. (No model.)

*To all whom it may concern:*

Be it known that I, JOSEPH MEYRICK, Jr., a citizen of the United States, and a resident of Louisville, in the county of Jefferson and State of Kentucky, have invented certain new and useful Improvements in Ball-Bearing Devices; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a representation of a sectional view of bearing. Fig. 2 shows detail views of cones. Fig. 3 shows detail views of ball-cups or races. Fig. 4 illustrates ball-retaining rings I. Fig. 5 illustrates in detail the soft-steel rings H.

This invention has relation to a shaft-bearing and is especially designed to provide a bearing for use in the wheels of bicycles and other vehicles requiring a light and easy-running construction.

The more particular objects of the invention with the advantages gained thereby will be hereinafter pointed out and described.

The invention consists in the novel construction and combination of parts, all as hereinafter described, and pointed out in the appended claims.

Referring to the accompanying drawings, in which I have illustrated the invention as applied to the rear wheel of a bicycle, the letter A designates the hub or shell, which is of considerably larger diameter than the axle (shown at B) and which is formed with the hollow enlarged end portions A'.

C C designate two tool-steel cones, one of which is firmly and permanently secured within each end portion of the hub or shell back of the enlarged end portions, the hub being slightly counterbored, as indicated at $a$, to receive the same. The cone or ball-bearing surfaces $c$ of said cones are formed upon the outer reduced end portions thereof which project into the chambers of the enlargements A'.

The axle B has a threaded portion B' or B² at each end, and upon these portions are screwed the respective ball cups or races E E', which are formed each with an extended sleeve-nut portion E². The ball-cups proper extend within the respective end portions of the hub in the manner shown in the drawings, and the balls G are seated within the same between their lateral and end or bottom walls and the cone-surfaces $c$. The bottom or end wall of each cup is formed with a cavity $h$, in which is seated a soft-steel ring H, having a surface $h'$, which, with the adjacent cone-surface $c$, forms a trough in which the balls rest. The inner end of each cup is also rabbeted or counterbored to seat a second ball-retaining ring I, as shown, whose inner face is flush with the inner end of the cup. Between each of these rings I and a shoulder $C^3$ of the adjacent cone C is seated an annular packing-ring J, which is of felt or other suitable material. Said ring J not only fills the space between the ring I and the shoulder of the cone, but it also fills the space between the inner end of the cup and the offset wall A², formed by the enlargement of the end portion of the hub. Extending outwardly from each of these spaces through the wall of the said enlargement are a series of spoke-receiving openings K, which are countersunk at the inner side to seat the headed ends $l$ of the spokes L. The spokes are put in place before the ball-cups are screwed upon the axle, being passed outwardly through the apertures K from the inside and secured in the rim at their outer ends in the usual manner. This is an important feature and advantage of the invention, owing to the facility with which it enables a broken or injured spoke to be removed and replaced, all that is necessary being to unscrew one of the ball-races and remove the axle, when the old spoke can be easily taken out and replaced, the cone offering no obstruction.

P designates the usual small sprocket-wheel, which is screwed upon one of the enlarged portions A' against a shoulder $a^2$ thereof. R is a lock-nut, which is screwed up against said wheel upon a threaded portion 3 of smaller diameter and which has holes $r$ drilled therein to fit a spanner-wrench. The hub portion of the sprocket-wheel is usually counterbored to seat said nut flush with its face.

S is a hexagonal nut which is screwed upon one end of the axle adjacent to the sprocket-wheel, and T is a step which is screwed upon the opposite end, and also serves as a nut.

The cones C, being permanently fixed within the hub, may be ground perfectly true after they are in their places, and as they govern the true alinement of the wheel this is a desirable feature.

The ball-races being screwed upon the axle in the manner described they are readily accessible, as either one of them can be readily unscrewed and removed, bringing the balls with it, the latter being prevented from falling out by the retaining-rings H and I. The balls can then be taken from the cups, cleaned, and replaced without having to handle the wheel.

The packing rings or washers render the bearings practically dust-proof, as they prevent dirt from entering either through the spoke-openings or through the openings at the ends of the hub.

I remark that without the sprocket-wheel the bearing above described is equally well adapted for use in the front wheels of bicycles and for other wheels also. It is also an excellent bearing for the pedals.

Having thus described my invention, what I claim as new, and desire to secure by Letters Patent, is—

1. In a ball-bearing device, the combination of a shaft or axle having a threaded portion at each end, a hub or shell having enlarged chambers at each end, a shouldered cone fixed within each end portion of said hub or shell between the said chambers and having an externally-reduced outwardly-beveled bearing portion which extends into the respective chamber, a hollow ball-cup screwed upon each end portion of said shaft or axle and seated within the said chambers, the balls within said cups, and ball-retaining devices at both ends of the said cups whereby the balls are held within the cups when the latter are removed, together with the annular packing or dust-guard rings, one at each side of the bearing, and seated between the inner wall of the said chambers and the shoulder of the cone and the inner end of the cup and the ring therein substantially as specified.

2. In a wheel-hub, the combination with the hub proper having enlarged end portions formed each with a series of spoke-receiving apertures or openings, of the shouldered bearing-cones fixed within the said hub between the said enlarged portions and extending into the same, the axle passing loosely through the said cones, the ball-bearing races or cups threaded upon said axle and extending into said enlarged portions, the balls seated within the said cups and upon the said cones, a retaining-ring seated in the outer or bottom wall of each cup, a second retaining-ring seated in the inner end of said cup, and a packing-ring or dust-guard seated upon the shoulder of each of the cones and against the inner end of each cup and filling completely the space into which the spoke-holes open, substantially as specified.

3. In a wheel-hub, the combination with the hub proper having the enlarged end portions, the shouldered cones permanently fixed within said hub, the axle, the ball-cups threaded upon said axle and extending within the said enlarged portions, and the balls therein, there being a space between the inner end of each of said cups and the shoulder of the adjacent cone, said enlarged portions having each a series of spoke-holes opening into said space, substantially as specified.

In testimony whereof I affix my signature in presence of two witnesses.

JOSEPH MEYRICK, JR.

Witnesses:
J. GARLAND NAUTZ,
E. M. WARD.